April 19, 1927.

A. H. BALLARD 1,625,761

BAKING OVEN

Filed July 3, 1922   3 Sheets-Sheet 1

Inventor:
Arthur H. Ballard,
by Emery, Booth, Janney & Varney
Attys.

Patented Apr. 19, 1927.

1,625,761

UNITED STATES PATENT OFFICE.

ARTHUR H. BALLARD, OF BOSTON, MASSACHUSETTS, ASSIGNOR TO BALLARD OVEN CORPORATION, OF BOSTON, MASSACHUSETTS, A CORPORATION OF MASSACHUSETTS.

BAKING OVEN.

Application filed July 3, 1922. Serial No. 572,403.

This invention consists of improvements in baking ovens, one object being to provide in a relatively small space an efficient baking oven of the conveyor type having a relatively large capacity.

For illustrative purposes the invention is here shown as embodied in a bread baking oven of relatively small dimensions and covering a relatively small area but provided with an endless traveling conveyor of large capacity on which the loaves are conveyed through the oven, the length of the conveyor exposed to the heat of the oven being relatively great. In the illustrated form indirect heating is utilized, the products of combustion being employed to heat properly located radiating surfaces of adequate area so arranged that an effective distribution and diffusion of the heated gases are secured.

The invention will be best understood by reference to the following description when taken in connection with the accompanying illustration of one specific embodiment thereof, while its scope will be more particularly pointed out in the appended claims.

In the drawings,—

Figure 1:
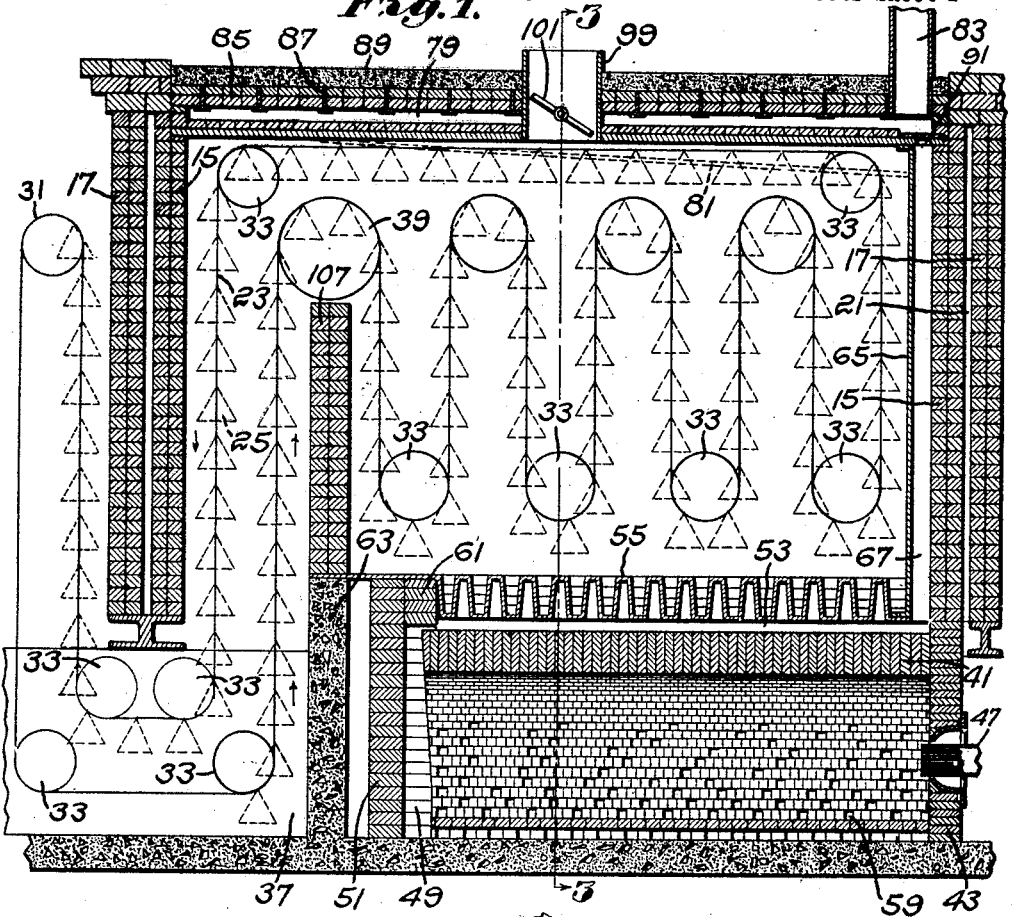
Fig. 1 is a central longitudinal, sectional elevation showing an oven embodying one form of the invention.

Referring to the drawings and to the embodiment of the invention therein illustrated, the baking chamber 5 is contained within a structure herein shown as erected on a concrete or other masonry setting 7 over a pit or depression in which is located the combustion chamber 9. The baking chamber is herein enclosed by heat insulating side walls and end walls which may be of any suitable construction, but herein are composed of two brick or other masonry side walls 11 and 13 and similar end walls 15 and 17, the two sets of walls being separated by insulating spaces 19 and 21. The insulating effect of air in the spaces 19 and 21 may be relied upon or said spaces may be filled with any suitable insulating material.

When the oven is in operation the baking chamber, as hereinafter described, is preferably closed except where provision is made for the entrance and exit of the traveling conveyor, and this is so arranged that the escape of the heated air through the entrance or exit opening for the conveyor is opposed by the inability of the heated air to displace the heavier, relatively cold, external air. The traveling conveyor may be of any suitable construction, but herein consists of a pair of chains 23 to each of which are jointed at suitable separate intervals depending supports 25, there being carried between each pair of supports a carrier tray 27 (Fig. 3) serving to hold the pans 29 or other receptacles in which the individual loaves of bread or other materials to be baked are carried through the oven. Conveyors of this general type are of common and well known construction.

The conveyor chains may be driven at any suitable point, as by the driving sprockets 31 located outside of and near the front end of the oven, any suitable driving power being utilized such as a motor and gearing (not shown) designed to give the proper rate of feed to the conveyor. The sprocket chains are guided at suitable intervals within and outside of the oven by guiding sprockets 33 journaled on shafts 35 and so located as to guide the conveyor in a circuitous path which doubles or turns on itself preferably a number of times so as to expose within the relatively small space of the baking chamber a considerable length of conveyor.

Referring to Fig. 1, it will be seen that the otherwise enclosed baking chamber has near its front end a pit or depression 37 through which the conveyor enters and leaves the peripheral limits of the chamber at a level below the bottom thereof, the travel of the conveyor being through the open end of the bottom wall of the chamber, thence laterally in the pit or depression beyond the peripheral limits of the chamber, and thence upwardly or downwardly to or over the driving sprocket 31 which is located conveniently above the floor level so as to permit one or more workmen standing on the floor level to have access to the conveyor for charging and discharging the same.

This permits the front walls 15 and 17 of the baking chamber to be brought down substantially to the level of the baking chamber floor and closes the baking chamber for entrance and exit except for the opening in the pit or depression 37. The tendency of the heated gases to rise and the cooler external air to sink under atmospheric pressure tends to cause the latter to seal the entrance-exit opening in the pit against the escape of the heated gases.

It will be seen that the conveyor enters the peripheral limits of the chamber through the pit or depression 37 in a horizontal path, passing around the guiding sprockets 33, and is then directed into a vertical path. After passing up over a pair of larger guiding sprockets 39 near the upper part of the chamber it takes a downward path until it reaches the bottom of the chamber, whereupon it passes over another pair of sprockets 33 and again assumes an upward path. This is repeated a number of times until the length of the baking chamber has been traversed, whereupon the conveyor engages the guiding sprockets 33 near the top of the oven and is directed in a substantially horizontal path near the top of the oven back to the forward end thereof and thence down and out through the opening at the bottom of the pit.

Each carrier tray, being suspended from a point above its center of gravity, maintains the same upright position at all times irrespective of the direction of travel of the conveyor. Guide supports to engage the ends of the trays or the chains themselves may be provided in the form of fixed guide plates or rods (not shown) at the sides of the baking chamber, or other suitable means may be employed to prevent the carrier from sagging in its upper horizontal path from the weight of the bread.

Referring now to the generation of heat and the provision for applying heat to the bread as it is conveyed through the baking chamber, the combustion chamber 9 is preferably enclosed by refractory walls such as the brick arch 41 which herein extends lengthwise the general direction of travel of the conveyor or in the direction of the greatest dimension of the baking chamber. The rear end of the combustion chamber is closed by the brick or other refractory wall 43, preferably ported for the admission of air. In the illustrative embodiment of the invention this wall has projecting through it and into the combustion chamber a crude oil burner 47 which may be of any usual or ordinary type and provided with well known devices (not shown) for regulating the supply of air and oil so that the temperature of the oven may be regulated to the requirements of the material being baked. If desired the opposite end of the combustion chamber may be closed, but herein, to assist the distribution of the products of combustion, it opens into a combustion space 49 formed by a transverse brick wall 51, the latter opening into an overhead heating chamber 53 which overlies the arch 41 and underlies the floor 55 under the baking chamber. The sides of the heating chamber 53 (Fig. 3) are formed by refractory walls 57 of brick or other suitable material, the marginal edges of the oven floor resting on the walls 57 and the masonry foundation 7.

The combustion chamber and its exits are so related to the radiating surfaces of the baking chamber as to provide for an efficient diffusion of the heat and a uniform temperature of the radiating surfaces without overheating. Heat is radiated directly from the top of the arch to the overlying oven floor, but the chamber is also provided with means to distribute and diffuse the products of combustion from the combustion chamber to the heating space 53 and the floor. For this purpose the combustion chamber is preferably tapped at intervals throughout its length. Any suitable arrangement of exit passages may be provided, but herein the chamber has a series of lateral ports or exit passages 59 which are located at intervals lengthwise the chamber and suitably positioned circumferentially around the same to best distribute the products of combustion to the heating space 53 and the oven floor. At its open end the top of the arch is extended somewhat into the combustion space 49 so as to reduce the area of the passage near its top and compel the gases to distribute laterally as they pass from the combustion space 49 into the heating chamber 53. Directly over the open end of the arch the brick work of the bridge wall is extended to form a wall 61 which covers the end of the arch but provides a relatively narrow throat or passage through which the hot gases pass from the combustion space 49 into the heating chamber 53. This overlying brick work protects the end of the radiating floor, hereinafter described, from direct contact with the hot gases in passing from the combustion space to the heating chamber.

To secure a large and effectively applied radiating surface for the baking chamber, I have herein provided an amplified radiating surface, the principal portion of which is located in the floor of the baking chamber so that a relatively simple construction is had and at the same time an effective radiating surface is utilized which underlies the conveyor and avails of substantially all ascending radiation from the combustion chamber in raising the heat of the baking chamber. Herein such amplified radiating surface is provided by the floor 55 which presents, as to the portion overlying the heating chamber 53, a series of corrugations or channel-like grooves extending transversely the direction of travel of the conveyor in the combustion chamber. This floor is preferably of sheet metal and may be constructed either in a single piece or in sections with overlapping edges, each section including one or more channels, or it may be put together in any other desired manner or constructed of other materials.

At the forward end of the baking chamber the floor is caused to overlap the brick work of the arch wall 41 and the bridge wall 61 as well as the masonry wall 63. At its rear end it is secured to the lower flanged end of the sheet metal plate 65, the latter constituting the rear wall of the baking chamber, and separated from the rear masonry wall 15 by a space 67 extending the entire width and height of the baking chamber, which space constitutes a rear upright exit flue for the heating chamber 53. The rear wall 65 of the baking chamber when heated by the ascending products of combustion serves as a radiating wall for the baking chamber.

Figure 2:
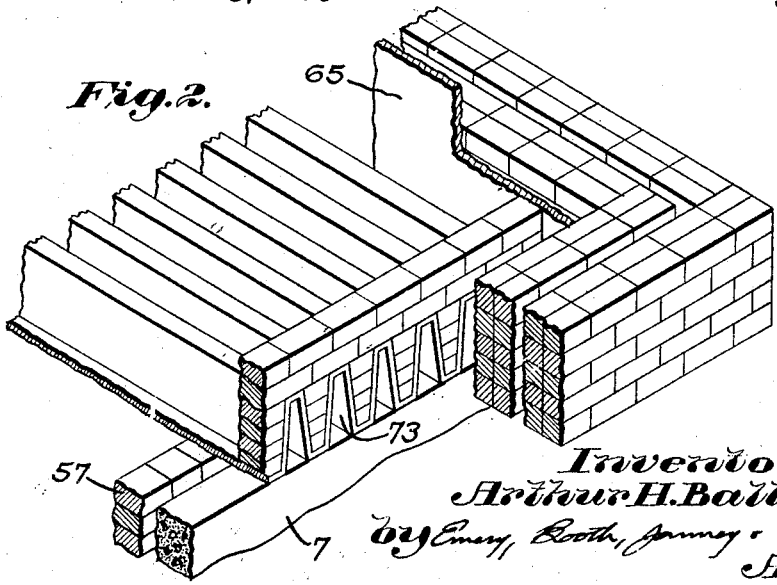
Fig. 2 is a detail in perspective showing the relation between the floor and side and end walls.

At the sides of the baking chamber where the channeled floor rests upon the heating chamber walls 57 and masonry setting 7, the baking chamber is provided with inner walls 69 which extend the entire length and height of the baking chamber and seal the upper marginal edges of the floor by fitting into the channels or corrugations thereof shown in Fig. 2. The walls 69 may be of any suitable material, but herein are formed of brick or other masonry work and provide between them and the inner side walls 11 upright exit flue chambers 71 for the heating space 53 which extend substantially the entire length and height of the baking chamber. The walls 69 when heated by the ascending products of combustion constitute side radiating walls for the baking chamber.

The channels or corrugations of the floor may be as deep as desired, but this expedient presents an uneven floor formation which provides a heat-absorbing surface for the bottom and heat-radiating surface for the top of greatly increased area as compared with that of a flat floor. At the same time it presents through its channel-like formation a series of underlying flue-like passages 73 which extend transversely the combustion chamber and transversely the length of the baking chamber, such passages being open to the heating chamber and serving to conduct the heated gases which are distributed thereto from the combustion chamber across the floor in contact with the corrugated walls. These flue-like passages 73, as will be seen from Figs. 2 and 3, each open at its opposite ends to the upright side flue-passages 71 so that the products of combustion, delivered throughout the length of the combustion chamber, first pass upward and are diffused or distributed to the various cross passages and are then conducted by the latter in oppositely moving streams and through parallel paths, which are divided or separated by the channel walls, across the under side of the radiating floor, passing off into the upright flue passages 71 where they still continue to heat the radiating side walls 69 during their ascent.

Figure 4:
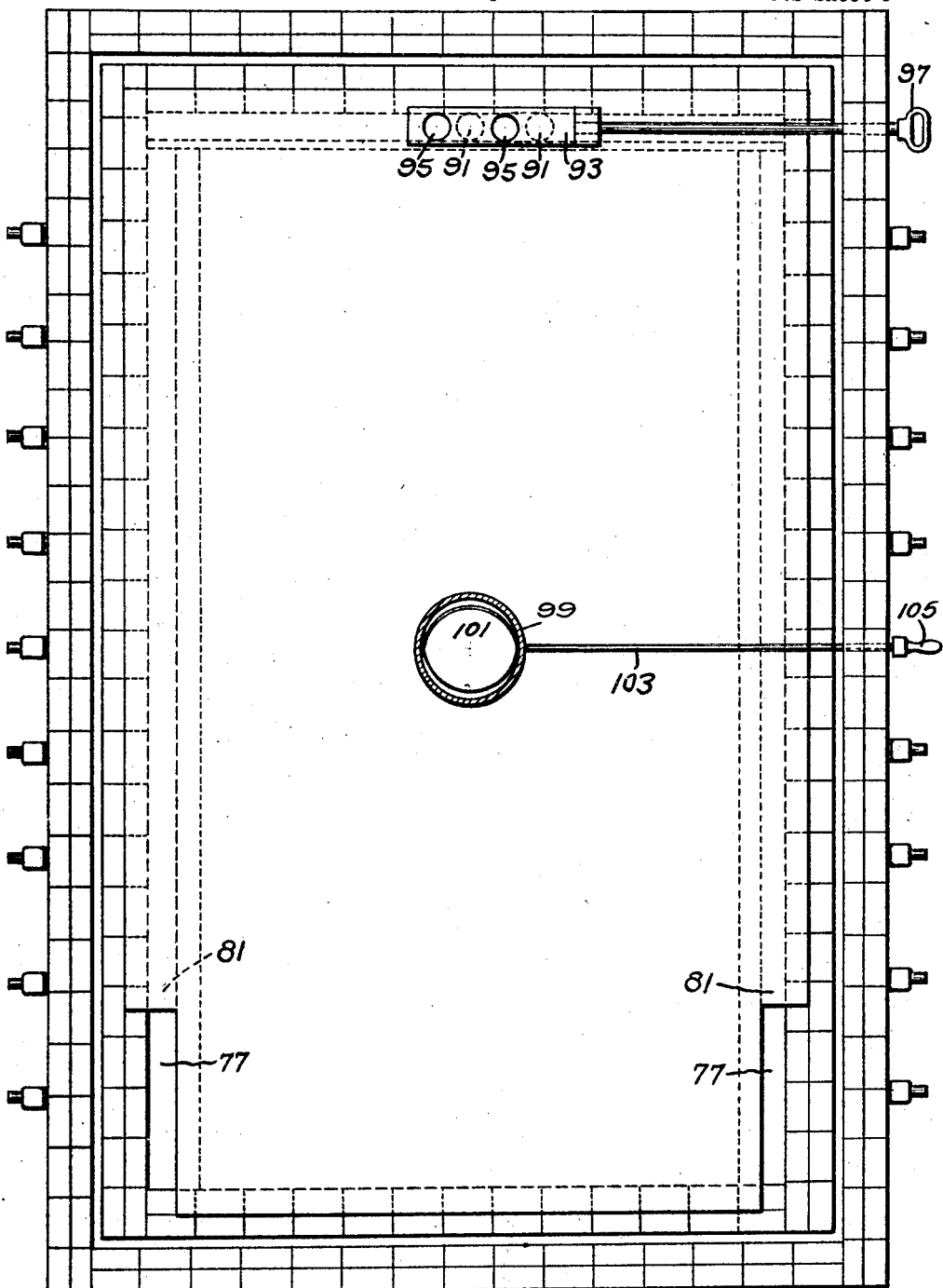
Fig. 4 is a plan view in partial section showing the top plate or wall of the baking chamber.

Preferably the escape of the gases is caused also to pass over the top of the heating chamber, and for this purpose the latter has a top wall in the form of a sheet metal plate 75 overlying the inner side walls 11 and the inner front and rear walls 15. This plate 75 closes the upright side flue passages 71 at their upper ends except for a short distance near the front of the chamber where (see Fig. 4) the plate is cut away to provide escape apertures 77 through which the ascending gases pass to a horizontal flue space 79 directly above the plate and extending the entire width and length of the baking chamber.

To prevent the gases from being pocketed at the rear upper ends of the upright side flues any suitable means may be provided and for that purpose I have shown in each side flue an inclined deflecting plate 81 which fills the flue and extends from the rear of the opening 77 downwardly at a slight inclination to the rear of each upright flue where it abuts against the upright rear plate wall 65. These plates 81 assist in advancing the gases which would otherwise tend to pocket in the rear portions of the flues toward the exit opening 77 at the front ends thereof.

Figure 3:
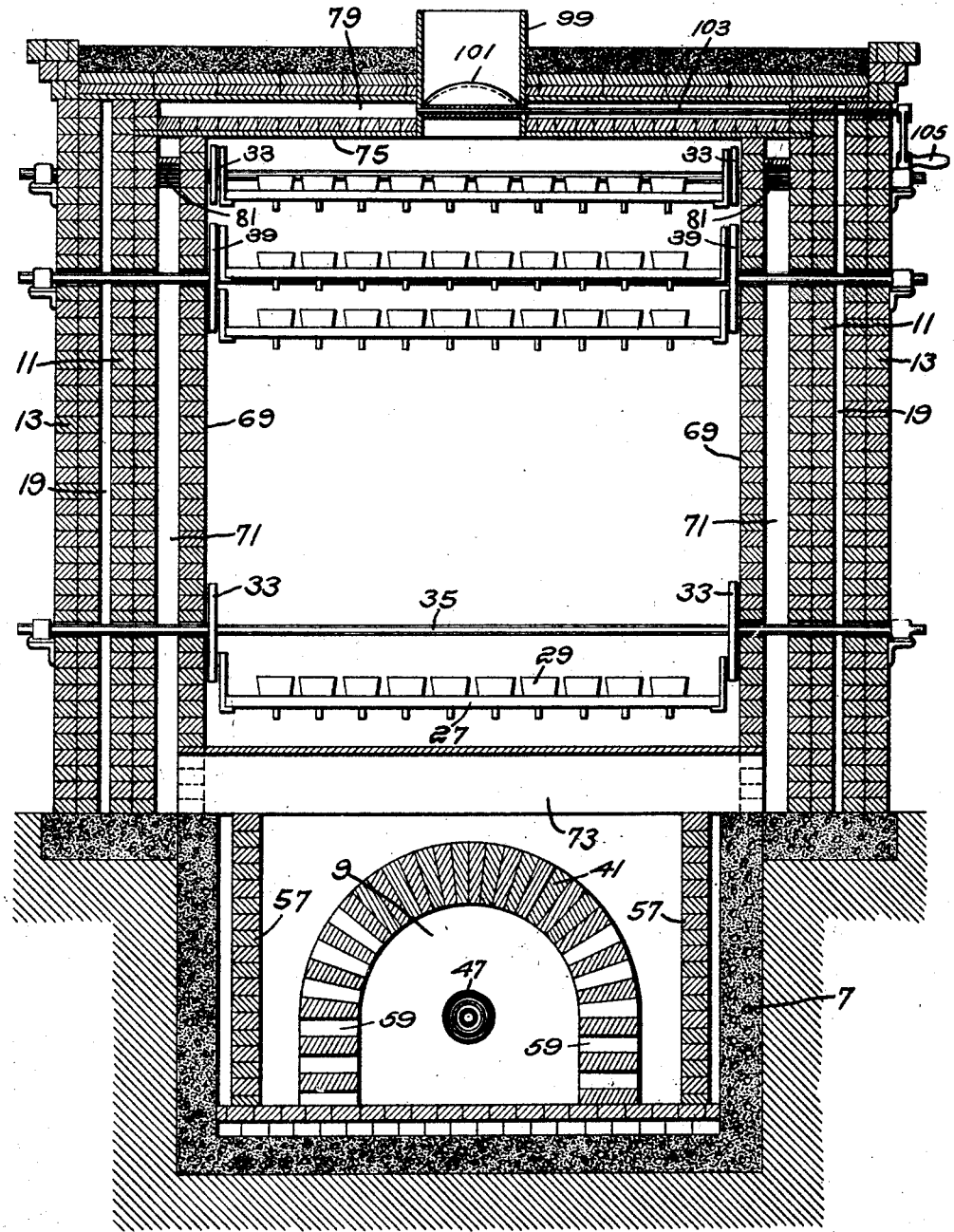
Fig. 3 is a transverse sectional elevation on the line 3—3 in Fig. 1.

When the gases emerge from the openings 77 they next pass over the top plate 75 to the rear of the structure and thence pass upward through one or more vertical exit flues 83 (Fig. 3). The horizontal flue space 79 is closed above by brick work 85 combined with structural members 87 over which there may be a covering 89 of sand or other suitable material.

While the rear upright flue 67 may be used as an exit flue during the operation of the oven, herein I have shown the same closed at the top by the plate 79 and shut off from the side flues 71 by the back wall plate 65 of the combustion chamber. This flue, however, has communication with the horizontal overhead flue space 79 and the exist flue 83 through one or more openings 91 in the plate 75 which may be opened or closed at will by the damper 93, the latter containing similar openings 95 which may be brought into registration with the openings 91 by moving the actuating rod 97, the end of which extends through the walls of the baking chamber.

The flue 67 is preferably used in intially starting up the oven, the damper being then opened to permit the products of combustion to pass from the heating chamber 53 directly through the back upright flue 67 and out the exit flues 83. When the temperature of the oven rises the damper is preferably closed so that, when in full operation, the gases pass wholly up the two side flues 71. If desired, however, the back flue may be opened and used during the operation of the oven.

In starting up the oven an interval usually elapses after the oven reaches its full working temperature before the baking chamber receives its full conveyor carried charge of dough. During that interval it is desirable to have some means for regulating the temperature to prevent overheating of the fractional charge of dough, which latter lacks the capacity to absorb the full heat of the oven. For this purpose there is herein provided a pipe 99 which opens into the top of the baking chamber and forms an outlet therefor normally closed by the damper 101. The damper is connected to the operating rod 103 and extends to the exterior of the baking chamber where it is provided with a handle 105 by which it can be turned to open more or less the exit passage and regulate the flash heat of the oven until the latter becomes filled with its intended charge of dough.

Herein to further oppose the escape of heat from the baking chamber there is interposed the upright transverse wall 107 between the first ascending run of the conveyor and the first descending run thereof, said wall extending transversely across the baking chamber and in front of the radiating floor surface thereof. This wall, however, may be omitted if desired.

The arrangement of the floor channels transverse the baking chamber not only provides a greater structural advantage in that the channels are required to span the shorter dimension of the chamber, but the transverse arrangement which carries the products of combustion to opposite marginal edges of the floor through divided paths transverse to the combustion chamber and to the general direction of travel of the conveyor provides for an extremely efficient diffusion and distribution of the heated gases over the radiating surfaces, and particularly in conjunction with the upright side flues by which they are carried through ascending paths wherein their heat is further utilized in contact with the radiating side walls of the chamber.

While I have herein shown and described for the purposes of illustration one specific form of the invention, it is to be understood that the same is not limited to the mechanical details shown or the relative form or arrangement of parts, but that extensive deviations may be made therefrom and the invention may have wide application to embodiments and constructions not herein suggested, all without departing from the spirit thereof.

Claims:

1. A baking oven having a baking chamber, a traveling conveyor with means to guide the same in a circuitous path into, through and out of said chamber, a radiating floor of uneven formation to present respectively lower and upper heat-absorbing and heat-radiating surfaces of extended area, a separate combustion chamber extending beneath the baking chamber and lengthwise the the general direction of travel of said conveyor through the same, said chamber having refractory walls, and means for distributing the heated gases from said combustion chamber to said radiating floor, the latter having horizontal flue-like passages on its under side extending transversely with relation to the length of said combustion chamber, there being also provided upright exit flues at the sides of said baking chamber and the marginal edges of said floor, said flues communicating with opposite ends of each horizontal flue-like passage.

2. A baking oven having a baking chamber, a traveling conveyor, a radiating bottom wall of uneven formation to present respectively lower and upper heat-absorbing and heat-radiating surfaces of extended area, a separate combustion chamber beneath said bottom wall from which the heated gases are distributed to the latter, said chamber having refractory walls and providing for a space intermediate the latter and the radiating wall, the latter also presenting flue-like passages on its under side, there being provided upright exit flues at opposite ends of said passages to withdraw the heated gases therefrom.

3. A baking oven having a baking chamber, a traveling conveyor, a radiating bottom wall for said chamber of uneven formation to present respectively lower and upper heat-absorbing and heat-radiating surfaces of extended area, said wall presenting flue-like passages extending across the same transverse to the general direction of travel of the conveyor, and a separate combustion chamber beneath said radiating bottom wall from which the heated gases are distributed to the latter, said chamber having refractory walls and providing an intermediate space between the chamber and the radiating bottom wall.

4. A baking oven having a baking chamber, a traveling conveyor, and means to guide the same, said chamber being provided with a continuous bottom wall of uneven formation to provide radiating surfaces of extended area, there being comprised within said wall flue-like passages transverse to the travel of the conveyor through the chamber through which passages the products of combustion are conducted.

5. A baking oven having a traveling conveyor, a baking chamber provided with radiating surfaces underlying the conveyor, said surfaces being of uneven formation to present an extended area and said surfaces forming a series of flue-like passages through which the products of combustion are conducted beneath said chamber in divided paths transverse to the travel of the conveyor through the chamber, and means to distribute said products of combustion to said passages.

6. A baking oven comprising in combination, a baking chamber, a traveling conveyor with means to guide the same through the chamber, a radiating floor of uneven formation to present increased radiating surface to the baking chamber and presenting to the heated gases channel-like passages extending to opposite sides of the baking chamber, exit flues at said opposite sides communicating with said channel-like passages, a combustion chamber, and means to distribute the gases from said combustion chamber to said channel-like passages.

7. A baking oven having a baking chamber, a traveling conveyor, a combustion chamber extending beneath said baking chamber, a radiating floor over the combustion chamber presenting divided paths for the products of combustion transverse to the baking chamber and the combustion chamber, and means to distribute the products of combustion from the combustion chamber to opposite sides of said radiating floor.

8. A baking oven having a baking chamber, a traveling conveyor, a corrugated radiating floor having its corrugations transverse to the direction of the travel of the conveyor and means for applying heated gases to the underside of said floor.

9. A baking oven having a baking chamber, a traveling conveyor therein, a corrugated radiating floor for the chamber, and a combustion chamber extending beneath the baking chamber through which the products of combustion are conveyed and from which they are distributed to the radiating floor, the corrugations of the floor being arranged transverse to the combustion chamber.

10. A baking oven having a baking chamber, a traveling conveyor therein, a combustion chamber beneath the same through which the products of combustion travel, a separate heating space above the combustion chamber to which the products of combustion are distributed from the combustion chamber, and a corrugated floor for the baking chamber with its corrugations extending transverse to the travel of the gases through the combustion chamber.

11. A baking oven having a baking chamber, a traveling conveyor, means for guiding the same in a circuitous path through said chamber, the greater dimension of said chamber being in the general direction of travel of said conveyor, and a heat radiating floor for said chamber having an open channeled formation, the channels extending transverse to the dimension of greater length.

12. A baking oven having a baking chamber, a traveling conveyor, a channeled radiating floor presenting respectively uneven lower and upper heat absorbing and heat radiating surfaces of extended area, and a combustion chamber beneath said floor having an arched masonry wall extending in a direction transverse the channels of said floor and provided with means for distributing to said floor the products of combustion.

13. A baking oven comprising in combination, a baking chamber, a traveling conveyor with means for guiding the same through the chamber, a radiating floor presenting transverse flue-like passages, a combustion chamber, means to distribute the gases to the floor from the chamber, and exit flues at opposite sides of the chamber to conduct the gases over the floor transverse to the direction of travel of the conveyor and thence away from the floor.

14. A baking oven comprising in combination, a baking chamber, a traveling conveyor with means for guiding the same through the chamber, radiating surfaces beneath the conveyor and presenting flue-like passages extending transverse the general direction of travel of the conveyor through the chamber, a combustion chamber, means to distribute the gases to the flue-like passages from the combustion chamber, and exit flues at opposite sides of the chamber to withdraw the gases from said flue-like passages and from said underlying radiating surfaces.

15. A baking oven comprising in combination, a baking chamber, a traveling conveyor, a radiating floor presenting transverse flue-like passages, a combustion chamber through which the products of combustion are conducted and from which they are distributed to the floor, and upright exit flues at the side of said baking chamber and presenting radiating walls to the baking chamber, said flues excluding the products of combustion from the baking chamber providing for the passage of the same across the bottom of said floor transverse to the length of the combustion chamber.

16. A baking oven having a baking chamber, a traveling conveyor with means to guide the same into the front end of the chamber and through the chamber, a radiating floor wall presenting transverse flue-like passages, a separate combustion chamber, and means to distribute the gases from said combustion chamber to the bottom of the floor wall, said chamber having double side walls to present opposite vertical flues for the gases passing over said floor wall, said flues having radiating walls exposed to the baking chamber on each side of said conveyor and excluding the products of combustion from the baking chamber.

17. A baking oven having a baking chamber, a traveling conveyor with means to guide the same into the front end of the chamber and through the chamber, a radiating floor wall, means to distribute the gases to the floor wall, said chamber having double side walls and double rear end walls to provide opposite side exit flues, and rear exit flues for the ascending gases each with a radiating wall exposed to the combustion chamber.

18. A baking oven having a baking chamber, a traveling conveyor with means to guide the same, radiating walls beneath the conveyor presenting substantially horizontal flue-like passages to which the gases are distributed, said chamber having double side walls to present opposite side flues for the ascending gases with radiating walls exposed to the baking chamber, said side flues communicating with the horizontal flue-like passages.

19. A baking oven having a baking chamber, a traveling conveyor with means to guide the same, and radiating walls beneath the conveyor presenting substantially horizontal flue-like passages to which the gases are distributed, said chamber having opposite vertical side flues with radiating walls exposed to the baking chamber, said flues communicating with the horizontal flue-like passages.

20. A baking oven having a baking chamber, a traveling conveyor, a combustion chamber, radiating walls in the baking chamber and beneath the conveyor and presenting respectively uneven lower and upper heat absorbing and heat radiating surfaces of extended area having horizontal flue-like passages to which the gases are distributed from the combustion chamber, opposite vertical side flues communicating with said passages, and a vertical end flue also communicating with the same.

21. A baking oven having a baking chamber, a traveling conveyor, radiating walls beneath the conveyor presenting respectively uneven lower and upper heat absorbing and heat radiating surfaces of extended area having substantially horizontal flue-like passages with divided paths for the products of combustion, means to distribute the products of combustion to said flue-like passages, and opposite vertical side flues communicating with said passages.

22. A baking oven having a baking chamber, a traveling conveyor, radiating bottom, top and side walls for said chamber, a combustion chamber, and means to distribute the heated gases over said bottom wall and to conduct the same up over said side walls, thence toward one end of the chamber and thence over said top wall toward the opposite end thereof.

23. A baking oven having an enclosed baking chamber, radiating walls within the chamber, a traveling conveyor, and means to guide the conveyor into and through the chamber, the latter being provided at one end with a pit through which the conveyor enters and leaves the peripheral limits of the chamber at a level below that of the radiating walls, thereby to oppose the escape of the heated gases.

24. A baking oven having an enclosed baking chamber, radiating bottom walls, a combustion chamber beneath said baking chamber, a traveling conveyor, and guiding means to guide the conveyor for entrance into and exit from the same end of the chamber at a level below that of said bottom walls, thereby to provide an entrance and exit opening sealed from the heated gases of the baking chamber.

25. A baking oven having a baking chamber, radiating walls therein, said chamber being enclosed by top and side walls and having a bottom wall enclosing the chamber except at one end, a combustion chamber with means to distribute the products of combustion to the radiating walls, and a traveling conveyor with means to guide the same, said conveyor entering and leaving said chamber by the open end of said bottom wall whereby its entrance and exit are sealed from the heated gases of the baking chamber.

26. A baking oven having a baking chamber with radiating walls therein, said chamber having top and side walls and having a bottom wall enclosing the chamber except at one end, and a traveling conveyor with means for guiding the same, the travel of said conveyor being through the open end of the bottom wall, thence laterally beyond the peripheral limits of the chamber and thence upwardly to and downwardly from a level above that of the bottom wall of the chamber.

27. A baking oven having an enclosed baking chamber, a traveling conveyor, radiating walls underlying the conveyor, an opening in the bottom of the chamber at one end thereof through which the conveyor enters and leaves the same, and a wall extending across the chamber at the said opening and said underlying radiating surface.

In testimony whereof, I have signed my name to this specification.

ARTHUR H. BALLARD.